Feb. 21, 1961     T. M. HERBERT ET AL     2,972,313
ANTI-TILT BOLSTER-MOUNTED BRAKES
Filed Oct. 14, 1959                        2 Sheets-Sheet 1
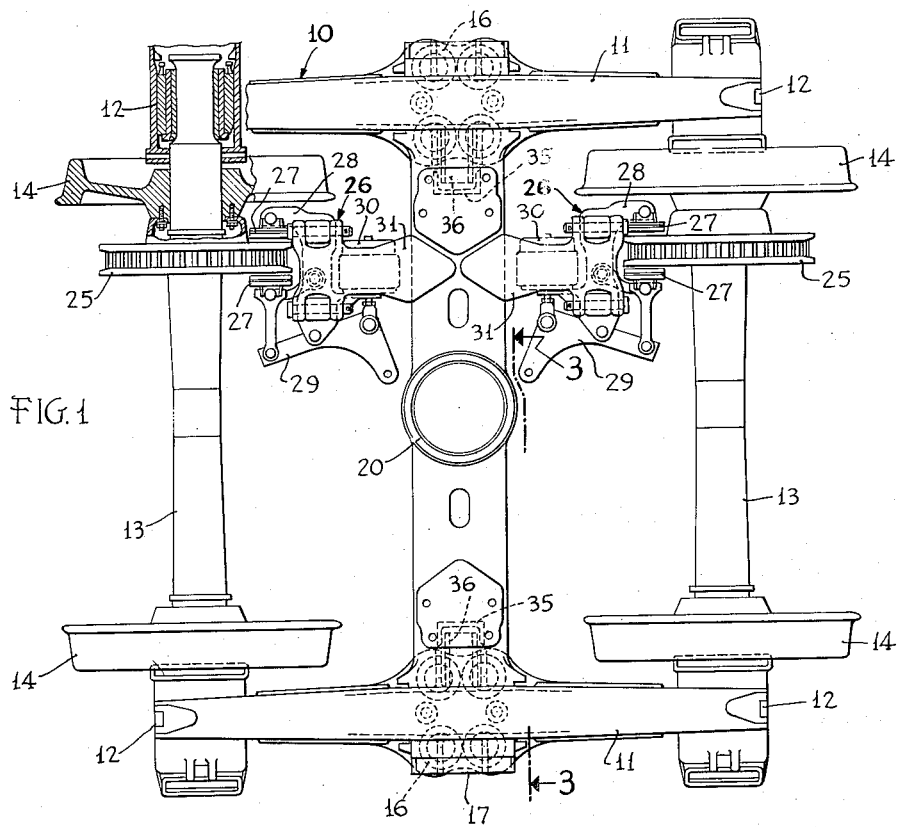
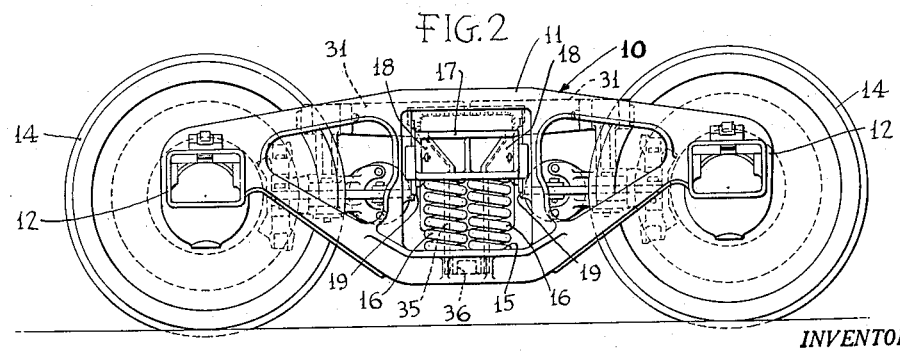
INVENTORS
Thomas M. Herbert
Omar E. Freholm
BY
Wm. R. Glisson
ATTORNEY

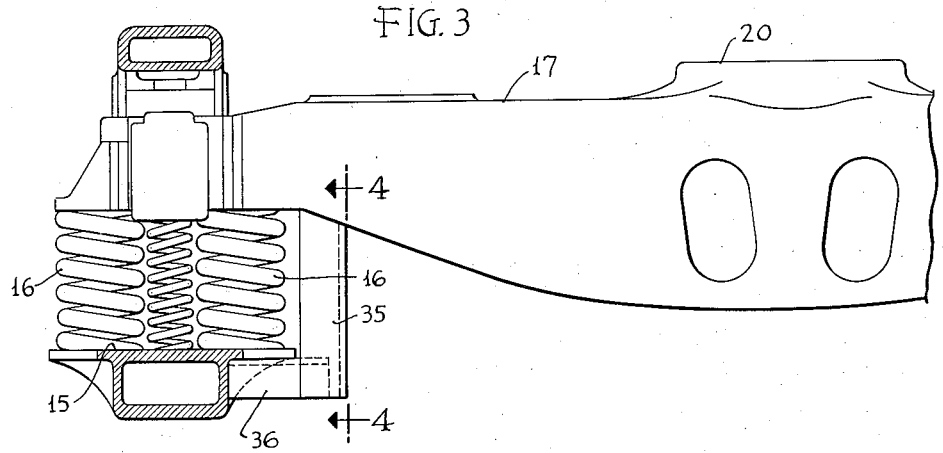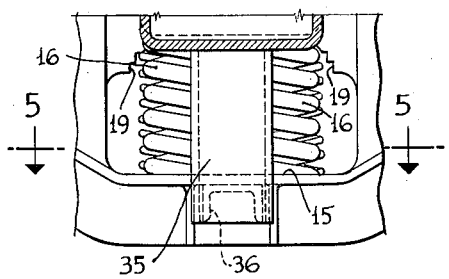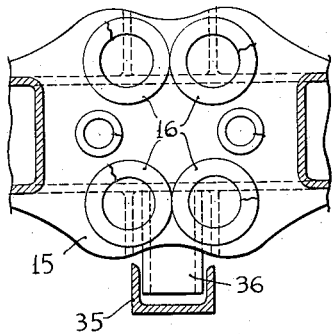

United States Patent Office 2,972,313
Patented Feb. 21, 1961

2,972,313
ANTI-TILT BOLSTER-MOUNTED BRAKES
Thomas M. Herbert, Huntingdon Valley, and Omar E. Freholm, Jenkintown, Pa., assignors to The Budd Company, Philadelphia, Pa., a corporation of Pennsylvania Filed Oct. 14, 1959, Ser. No. 846,287
3 Claims. (Cl. 105—200)

This invention relates to bolster-mounted brakes and has for an object the provision of improvements in this art.

One of the particular objects of the invention is to provide means for stabilizing a truck bolster on which brakes are mounted to minimize tilting of the bolster when the brakes are applied.

Another object is to provide simple and inexpensive apparatus for reducing the tilting of the bolster.

The above and other objects and features of the invention will be apparent from the following description of an exemplary embodiment, reference being made to the accompanying drawings, wherein:

Fig. 1 is a plan view of a truck embodying the present invention;

Fig. 2 is a side elevation;

Fig. 3 is a partial enlarged transverse vertical section taken on the line 3—3 of Fig. 1;

Fig. 4 is a longitudinal vertical section and elevation taken on the line 4—4 of Fig. 3; and Fig. 5 is a plan and sectional view taken on the line 5—5 of Fig. 4.

The truck 10 with which the present invention was developed is a known type used in freight service and includes side frame members 11 having axle bearing boxes 12, wheel-axle units comprising axles 13 and wheels 14 fast thereon, enlarged spring seats 15 formed in openings in the side frame members, springs 16 thereon, and a bolster 17 mounted on the springs. The bolster has friction slide means 18 engaging vertical guides 19 at the sides of the spring-receiving openings and also has a center pin bearing 20 for turnably supporting a car body.

The truck is basically designed for the use of wheel tread brakes operated by mechanism mounted on the side frames. Consequently, in such intended use the bolster is only required to move up and down in the guides in the side frames and to resist only the turning movement caused by inertia generated movements between the car body and truck.

There is an increasing demand for disk brakes on freight car trucks such as this and the economics of the situation do not in all cases allow the procurement of new trucks designed for disk brakes.

A convenient place to mount the brake operating mechanisms is on the bolster of the truck but such an arrangement puts heavy turning loads on the bolster which cause it to tilt about a transverse horizontal axis. The mountings are such that this tilting movement is permitted but it allows the brake shoes to shift out of effective position or at times to move off the braking disk entirely and it also causes the friction slides to bind in their guides to such an extent that the bolster does not function properly for its intended purposes.

Herein there is shown a disk brake installation comprising disks 25 rigidly mounted on the wheels 14 and brake operating mechanisms 26 mounted on opposite sides of one end of the bolster. The details of this installation are not important herein but the drawings show lined brake shoes 27 carried by frames 28 and levers 29 and actuated by fluid power devices 30. The frames 28, carrying the levers 29, are swingably and turnably suspended by brackets 31 rigidly attached to the bolster, as by welding.

According to the present invention means are provided for transferring turning loads from the bolster to the side frame members 11. As originally provided on the truck there is no connection between the bolster and the side frame members, other than the friction guides, except through the springs 16. Hereby the bolster and side frames are provided with interacting means for resisting the turning movement while allowing the required vertical movements between them, the means herein shown including a vertically projecting arm 35 secured, as by welding, near each end of the bolster and a laterally projecting guide bracket 36 secured, as by welding, to each side frame member.

The members 35 and 36 are shown as being located inboard of the side frame members. Here they do not interfere with the separation of the side frame members from the axles, even when the members 35 and 36 are permanently welded to the bolster and side frames. If it is desired to have the reaction members located outboard of the side frame members it will be preferable to bolt the members 35 to the bolster so they can be removed when the wheel-axle units are to be changed. The latter arrangement has the advantage that when a truck of this general type is equipped with a spring plank the ends of the spring plank will be cleared. Of course, if an inboard location is preferred, the member 35 can be formed to straddle the spring plank or can react with the spring plank if the latter is then limited in its longitudinal movements on its seats on the side frame members, as shown in the copending application of Thomas M. Herbert, S.N. 846,288, filed October 14, 1959.

The arms 35 are of considerable length so as to have good leverage about the horizontal turning axis of the bolster whereby fully to inhibit undue turning movement of the bolster when the brakes are applied.

It is thus seen that the invention provides simple, efficient and economical means for limiting the turning movement of the bolster when the brakes are applied.

While certain embodiments of the invention have been specifically described for purposes of illustration, it is to be understood that there may be various embodiments and modifications within the general scope of the invention.

What is claimed is:

1. A railway truck comprising in combination, side frames, wheel-axle units turnably mounted in said side frames, a bolster mounted for vertical movement on springs on said side frames, said side frames having vertical guides in which the ends of the bolster slide, brake operating means mounted on said bolster, and stabilizing means, other than said vertical guides, between said bolster and a side frame, including a lever arm and a reactor guide member therefor, which limit the turning movement of the bolster by reaction against the side frame when the brakes are applied.

2. A railway truck as set forth in claim 1, wherein said lever arm is mounted on and extends downward from the bolster, and said reaction guide member is mounted on the side frame.

3. A railway truck as set forth in claim 1, wherein said arm and reaction guide member are located on the inboard side of the side frame.

References Cited in the file of this patent
UNITED STATES PATENTS

| 1,196,180 | Tomlinson | Aug. 29, 1916 |
| 1,832,849 | Apps | Nov. 24, 1931 |